United States Patent Office 3,489,688
Patented Jan. 13, 1970

3,489,688
BUBBLE BATH COMPOSITION
Heinz Pospischil, Ettlingen, Germany, assignor to W. Spitzner, Arzneimittelfabrik G.m.b.H., Ettlingen, Baden, Germany
No Drawing. Continuation-in-part of application Ser. No. 391,792, Aug. 24, 1964. This application Nov. 21, 1967, Ser. No. 684,642
Claims priority, application Germany, Sept. 23, 1963, S 87,471
Int. Cl. C11d *17/00, 1/18*
U.S. Cl. 252—152                                     8 Claims

ABSTRACT OF THE DISCLOSURE

A bubble composition consisting of shaped pieces which quickly disintegrate and dissolve in contact with water is made by dispersing a gas inert to the other ingredients in a molten mixture of a predominant amount of polyethylene glycol having an average molecular weight of 2,000 to 20,000 with a much smaller amount of a wetting agent capable of significantly reducing the surface tension of a water film in contact with air, and by cooling the mixture until it solidifies and traps the gas in a multiplicity of closed cells.

REFERENCE TO RELATED APPLICATION

This application is a continuation-in-part of my copending application Ser. No. 391,792, filed on Aug. 24, 1964, and now abandoned.

BACKGROUND OF THE INVENTION

This invention relates to bubble bath compositions, and particularly to bubble bath compositions which are shaped solids.

It is known to prepare bubble bath compositions from synthetic surface active agents, more specifically wetting agents. Solid bubble bath compositions containing such surface active agents as their principal active ingredient have a wax-like or fatty touch. When such compositions are prepared from a surfactant, a carrier, and minor adjuvants, such as perfume and coloring agents, and are shaped into tablets of suitable size on a tableting press, as is conventional, the constituent particles cohere firmly, and the tableted pieces dissolve relatively slowly in warm water.

In order to overcome this well known problem, an attempt has been made to incorporate readily soluble salts in granular form in the mixture prior to tableting. Some improvement can be achieved in this manner, but much is still left to be desired. The addition of compounds which yield carbon dioxide upon contact with water enhances solubility of a bath composition only to a limited extent. The gas generated tends to escape through small openings while at relatively high pressure, and the voids formed do not significantly increase the available interface between composition and water which controls the rate of dissolution. The carbon dioxide cannot disperse the solid material in the water.

In preparing a bubble bath, it is customary to add the bath composition to a small amount of water in the bottom of a bath tub, and to rely on the remainder of the water, entering the tube in a stream from a faucet above the water level, for generating the bubbles. The wetting agent in the bath composition, to be effective, must thus be fully available within the relatively short period, less than ten minutes, required for filling the tub to operating level. A portion of the wetting agent which dissolves only after the water supply has been shut off does not materially contribute to the formation of bubbles.

The primary object of the invention is the provision of a solid bubble bath composition in shaped pieces which quickly dissolve upon contact with water.

SUMMARY OF THE INVENTION

With this and other objects in view, the invention, in one of its aspects provides a bubble bath composition which consists essentially of a major amount of a solid, water-soluble mixture of polyethylene glycol as a carrier and of a minor amount of a wetting agent, the mixture defining therein a multiplicity of cells filled with a gas which is inert to the carrier and the wetting agent.

In another aspect, the invention resides in a method for preparing the afore-described bath composition in which the normally solid water-soluble polyethylene glycol is heated until liquefied, and the water-soluble wetting agent is dispersed in the carrier to produce a substantially liquid mixture. An inert gas is then dispersed in the liquid mixture in an amount sufficient to convert the mixture into a foam-like mass. When the temperature of the mass is then reduced, there is obtained a solid, shaped piece of bubble bath composition of the invention.

DESCRIPTION OF THE PREFERRED EMBODIMENTS

The following examples are further illustrative of the present invention, and it will be understood that the invention is not limited thereto:

EXAMPLE I 250 grams polyethylene glycol having an average molecular weight of 6,000 were heated to fusion in a vessel arranged in a water bath. 3 grams citric acid were then admixed by stirring. 80 grams of an aqueous 50% solution of sodium lauryl sulfate were intimately mixed in another vessel at room temperature with 10 grams sodium bicarbonate, 20 grams polyethylene glycol having an average molecular weight of 400, 10 grams perfume and two grams of a water soluble coloring agent.

The acidified contents of the first-mentioned vessel were kept at 65° C. while the mixture prepared in the second vessel was dispersed therein by vigorous agitation. The combined mass expanded and foamed. It was stirred from time to time until the development of carbon dioxide from the reaction of the citric acid with the sodium bicarbonate had subsided, and no further increase in volume could be observed. The material at this stage had a foam-like plastic consistency. It was stirred again to make it as uniform as possible without breaking the bubbles, and batches were cast in water-cooled molds in which they solidified.

EXAMPLE II 250 grams polyethylene glycol having an average molecular weight of 4,000 were heated in a vessel on a water bath until fused. In another vessel, 80 grams of an aqueous 50% solution of sodium lauryl sulfate were intimately mixed at room temperature with 10 grams polyethylene glycol having an average molecular weight of 400, 5 grams perfume, and 3 grams water soluble coloring agent. The last mentioned mixture was poured into the fused polyethylene glycol 4,000 with vigorous agitation, whereby the wetting agent was dissolved in the polyethylene glycol while a temperature of 60° C. was maintained.

At this temperature, the mass was liquid, but rather viscous. Heated air was introduced into the mass under pressure from a nozzle while the mass was being agitated by means of a rapidly rotating stirrer. The air was dispersed in the viscous material which was converted to a foam. When the expansion of the mass by the dispersed air was considered adequate, batches thereof were poured into water cooled molds.

The solidified pieces were unmolded and were ready for use.

While the invention has been described with specific reference to sodium lauryl sulfate, an anionic surfactant, as the preferred wetting agent in the bath composition of the invention, it will be appreciated that bubble bath compositions including other surface active agents may be prepared in the same manner. Anionic, cationic and non-ionic surfactants may replace the sodium lauryl sulfate in an obvious manner, but the nature of the surface active agent may limit the choice of the gas that is employed for foaming the liquid mixture of the active agent and a carrier. Air and nitrogen are sufficiently inert to all commerical surfactants, but carbon dioxide is not. If the gaseous foaming agent is soluble in the liquefied mixture of carrier and active agent, it must be employed in excess of its solubility.

Sodium lauryl sulfate may be replaced in the bubble bath compositions of the Examples by other sulfated fatty alcohols having 8 to 18 carbon atoms, and by other anionic wetting agents such as sodium lauryl ether sulfate, alkyl aryl sulfonates, such as sodium dodecylbenzenesulfonate or sodium alkylnaphthalene sulfonates, or sodium lauryl sulfoacetate.

Because any surface active agent which reduces the surface tension of water in contact with air enhances the bubbleforming ability of water, cationic and non-ionic surface active agents may replace the anionic surfactants mentioned above, but are not usually economically attractive. However, quaternary ammonium salts, more specifically alkyl trimethyl ammonium chlorides such as lauryltrimethylammonium chloride and alkyl benzyl dimethylammonium chloride are effective. Similar considerations apply to such nonionic surfactants as polyethyleneglycol lauryl ether, the polyethylene glycol esters of fatty acids and rosin acids, fatty acid alkanolaides, and tris(polyethylene)sorbitan monolaurate.

Polyethylene glycol is the best carrier for the bubble bath compositions of the invention, and particularly those types of polyethylene glycol which are normally solid and can be fused at temperatures below the boiling point of water, thus permitting the use of a water bath in the preparation of the composition. Polyethylene glycol having average molecular weights between 2,000 and 20,000 thus are generally useful for preparing the bath compositions of the invention, and those having molecular weights between 4,000 and 6,000 are preferred. Their melting points are sufficiently above the temperature of a normal hot bath, that is above 40° C., yet below 100° C.

The proportions of carrier and wetting agent in the bubble bath compositions of the invention are not critical as long as the amount of the carrier is much greater than that of the wetting agent. The composition should not contain less than 60 percent polyethylene glycol having a molecular weight of 2,000 to 20,000, the balance consisting of wetting agent and minor ingredients, such as perfume and coloring matter. It is not normally necessary to employ more than 12% by weight of the wetting agent, although the exact proportions of wetting agent and carrier depend somewhat on the nature of the wetting agent.

The lower limit of wetting agent percentage in the bubble composition is not critical and depends on the effect which it is desired to achieve. The amount of wetting agent contained in a single cake of the composition should substantially increase the foaming tendency of five gallons of water when agitated.

The shape in which the bath compositions of the invention are molded are not critical, but the molded pieces are preferably of sufficient size so that a single piece provides a sufficient amount of wetting agent for a normal bath.

The air or carbon dioxide in bath compositions prepared in the manner of the examples is confined within the solid mixture of carrier and wetting agent in closed cells. When the solid material is sufficiently foamed, the walls of these cells are very thin and dissolve readily, thereby admitting water to contact with a large internal surface of the cake in a very short time.

The amount of bubble bath composition of the invention normally producing a good head of foam on a hot bath should be of the order of 25 g., and the composition is preferably molded in cakes of a corresponding weight so that a single cake is sufficient for preparing a bubble bath. The cake disintegrates and dissolves completely in warm water having a temperature of 30° to 40° C. in about 3 minutes. Under the water pressure normally prevailing in domestic water supply systems, it takes approximately 5 to 7 minutes to fill a tub with warm water. The agitation of the liquid in the tub by the water running from the faucet is sufficient to produce the desired bubbles if the time required for filling the tub is much longer than the time required for disintegration and dissolution of the composition.

Polyethylene glycol, while mainly functioning as a carrier, also stabilizes the liquid foam during preparation of the bath compositions of the invention, and has a similar stabilizing effect on the bubbles formed in a bath.

What is claimed is:
1. A cake of bubble bath composition consisting essentially of a solid, water-soluble mixture of polyethylene glycol having an average molecular weight of 2,000 to 20,000, and of a nonionic, anionic, or cationic wetting agent, said mixture defining therein a multiplicity of closed cells containing a gas which is inert to said polyethylene glycol and said wetting agent, the amount of said polyethylene glycol being at least 60 percent of said mixture, and, the amount of said gas being sufficient to form a foam-like mass with said mixture above the melting point of said polyethylene glycol.

2. A cake of bubble bath composition as set forth in claim 1, wherein said mixture has a melting point below 100° C., but not below 40° C., and said polyethylene glycol has an average molecular weight between 4,000 and 6,000.

3. A cake of bubble bath composition as set forth in claim 1, wherein said gas is air, nitrogen, or carbon dioxide.

4. A cake of bubble bath composition as set forth in claim 3, wherein said wetting agent is an anionic surfactant.

5. A cake of bubble bath composition as set forth in claim 4, wherein the amount of said wetting agent in said mixture is not greater than about 12 percent.

6. A method of preparing a solid bubble bath composition which comprises:
   (a) heating normally solid, water-soluble polyethylene glycol having a molecular weight of 2,000 to 20,000 until it is liquefied;
   (b) dispersing an effective amount of a water-soluble nonionic anionic, or cationic wetting agent smaller than the amount of said polyethylene glycol in the liquefied polyethylene glycol to produce a substantially liquid mixture;
   (c) dispersing a gas inert to said polyethylene glycol and to said wetting agent in the liquid mixture in an amount sufficient to convert said mixture into a foam-like mass; and (d) reducing the temperature of said mass until said liquid mixture solidifies.

7. A method as set forth in claim 6, wherein said wetting agent is dissolved in said liquefied polyethylene glycol.

8. A method as set forth in claim 6, wherein said mass is divided into a plurality of batches prior to said reduction of the temperature thereof, each batch is placed in a container, and solidified in the same by reduction of the temperature thereof.

References Cited
UNITED STATES PATENTS 2,987,484   5/1959   Lundberg et al. _____ 252—174

LEON D. ROSDOL, Primary Examiner

P. E. WILLIS, Assistant Examiner

U.S. Cl. X.R.

252—137, 138, 161